United States Patent
Hurewitz

(10) Patent No.: US 8,209,253 B2
(45) Date of Patent: *Jun. 26, 2012

(54) MATCHING RESOURCES OF A SECURITIES RESEARCH DEPARTMENT TO ACCOUNTS OF THE DEPARTMENT

(75) Inventor: Barry S. Hurewitz, New York, NY (US)

(73) Assignee: Morgan Stanley, New York, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 12/706,054

(22) Filed: Feb. 16, 2010

(65) Prior Publication Data
US 2010/0145757 A1    Jun. 10, 2010

Related U.S. Application Data

(63) Continuation of application No. 10/857,400, filed on May 28, 2004, now Pat. No. 7,689,490.

(51) Int. Cl.
*G06Q 40/00* (2012.01)
(52) U.S. Cl. .................................. 705/36 R; 705/35
(58) Field of Classification Search ............. 705/36 R, 705/35
See application file for complete search history.

(56) References Cited

U.S. PATENT DOCUMENTS

| | | | |
|---|---|---|---|
| 4,710,763 A | 12/1987 | Franke et al. | |
| 5,128,860 A | 7/1992 | Chapman | |
| 5,502,637 A | 3/1996 | Beaulieu et al. | |
| 5,630,070 A | 5/1997 | Dietrich et al. | |
| 5,822,410 A | 10/1998 | McCausland et al. | |
| 5,864,853 A | 1/1999 | Kimura et al. | |
| 5,913,201 A | 6/1999 | Kocur | |
| 5,940,843 A | 8/1999 | Xucknovich et al. | |
| 5,963,911 A * | 10/1999 | Walker et al. | 705/7.12 |
| 5,968,121 A | 10/1999 | Logan et al. | |
| 6,029,146 A | 2/2000 | Hawkins et al. | |
| 6,049,599 A | 4/2000 | McCausland et al. | |
| 6,292,830 B1 | 9/2001 | Taylor et al. | |
| 6,324,523 B1 | 11/2001 | Killeen, Jr. et al. | |
| 6,330,545 B1 | 12/2001 | Suh | |
| 6,374,227 B1 | 4/2002 | Ye | |
| 6,381,744 B2 | 4/2002 | Nanos et al. | |
| 6,415,269 B1 | 7/2002 | Dinwoodie | |

(Continued)

FOREIGN PATENT DOCUMENTS

EP    1265157 A2    12/2002

(Continued)

OTHER PUBLICATIONS

Horan et al., "Portfolio Management, Private Information, and Soft Dollar Brokerage: Agency Theory and Evidence," first draft Jul. 1996, current draft Jul. 1999.

(Continued)

*Primary Examiner* — Jagdish Patel
*Assistant Examiner* — Kevin Poe
(74) *Attorney, Agent, or Firm* — K&L Gates LLP

(57) ABSTRACT

Systems and methods for allocating limited resources of a securities research department to accounts of the department are disclosed. According to various embodiments, the system includes an account scoring module and a resource matching module. The account scoring module is for generating a score for each account, and the resource matching module is for matching the resources of the department to the accounts based on the scores for each account.

20 Claims, 6 Drawing Sheets

U.S. PATENT DOCUMENTS

| | | | |
|---|---|---|---|
| 6,470,325 B1 | 10/2002 | Leemhuis | |
| 6,507,825 B2 | 1/2003 | Suh | |
| 6,510,419 B1 * | 1/2003 | Gatto | 705/36 R |
| 6,519,571 B1 | 2/2003 | Guheen et al. | |
| 6,671,674 B1 | 12/2003 | Anderson et al. | |
| 6,681,211 B1 * | 1/2004 | Gatto | 705/36 R |
| 6,968,317 B1 | 11/2005 | Wallace et al. | |
| 7,072,858 B1 | 7/2006 | Litzow et al. | |
| 7,171,471 B1 | 1/2007 | Nair | |
| 7,689,490 B2 | 3/2010 | Hurewitz | |
| 7,734,517 B2 | 6/2010 | Hurewitz | |
| 7,752,103 B2 | 7/2010 | Hurewitz | |
| 7,769,654 B1 | 8/2010 | Hurewitz | |
| 7,904,364 B2 | 3/2011 | Hurewitz | |
| 7,953,652 B1 | 5/2011 | Hurewitz | |
| 2002/0002522 A1 | 1/2002 | Clift | |
| 2002/0016752 A1 | 2/2002 | Suh | |
| 2002/0026321 A1 | 2/2002 | Faris et al. | |
| 2002/0035534 A1 | 3/2002 | Buist et al. | |
| 2002/0055901 A1 | 5/2002 | Gianakouros et al. | |
| 2002/0065758 A1 | 5/2002 | Henley | |
| 2002/0073108 A1 | 6/2002 | Morita et al. | |
| 2002/0111890 A1 | 8/2002 | Sloan et al. | |
| 2002/0198815 A1 | 12/2002 | Greifeld et al. | |
| 2003/0083926 A1 | 5/2003 | Semret et al. | |
| 2003/0101124 A1 | 5/2003 | Semret et al. | |
| 2003/0113692 A1 | 6/2003 | Kamano | |
| 2003/0144932 A1 | 7/2003 | Martin et al. | |
| 2003/0158807 A1 | 8/2003 | Takeshi | |
| 2003/0225666 A1 | 12/2003 | Murtaugh et al. | |
| 2003/0236721 A1 | 12/2003 | Plumer et al. | |
| 2004/0010592 A1 | 1/2004 | Carver et al. | |
| 2004/0088206 A1 * | 5/2004 | Thompson et al. | 705/7 |
| 2004/0111308 A1 | 6/2004 | Yakov | |
| 2004/0138998 A1 | 7/2004 | Lawrence | |
| 2004/0181378 A1 | 9/2004 | Gilmore | |
| 2005/0096950 A1 | 5/2005 | Caplan et al. | |
| 2005/0097028 A1 * | 5/2005 | Watanabe et al. | 705/37 |
| 2005/0125274 A1 * | 6/2005 | Nastacio et al. | 705/8 |
| 2005/0172083 A1 | 8/2005 | Meiri | |
| 2005/0216323 A1 | 9/2005 | Weild | |
| 2005/0240456 A1 * | 10/2005 | Ward et al. | 705/7 |
| 2005/0246264 A1 | 11/2005 | Plunkett | |
| 2005/0261922 A1 | 11/2005 | Marchisotto et al. | |
| 2005/0261999 A1 | 11/2005 | Rowady, Jr. | |
| 2005/0278240 A1 | 12/2005 | Delenda | |
| 2006/0085321 A1 | 4/2006 | Staib et al. | |
| 2006/0149657 A1 | 7/2006 | Weild | |
| 2006/0167703 A1 | 7/2006 | Yakov | |
| 2007/0264986 A1 | 11/2007 | Warrillow et al. | |
| 2008/0021805 A1 | 1/2008 | Hansen et al. | |
| 2008/0021844 A1 | 1/2008 | Sanwal et al. | |

FOREIGN PATENT DOCUMENTS

| | | |
|---|---|---|
| JP | H5/342215 | 12/1993 |
| JP | H8/278978 A | 10/1996 |
| JP | 2000/3389 A | 1/2000 |
| JP | 2000/231567 A | 8/2000 |
| JP | 2002/24648 A | 1/2002 |
| JP | 2002/116933 A | 4/2002 |
| JP | 2002/531900 A | 9/2002 |
| JP | 2003/16282 A | 1/2003 |
| JP | 2003/99546 A | 4/2003 |
| JP | 2003/345971 | 5/2003 |
| JP | 2003/288467 A | 10/2003 |
| JP | 2003/288469 | 10/2003 |
| JP | 2003/323534 A | 11/2003 |
| JP | 2004/54662 A | 2/2004 |
| WO | WO 00/33238 A2 | 6/2000 |
| WO | WO 02/42880 A2 | 5/2002 |

OTHER PUBLICATIONS

Schwartz, "Commission Recapture Success", Traders Magazine, Oct. 1, 2000.

InvestorWords.com Definition of "Profit"—The positive gain from an investment or business operation after subtracting for all expenses. Opposite of loss, from http://www.investorwords.com/3880/profit.html on May 24, 2010.

Non-Final Office Action mailed Jun. 2, 2010 for U.S. Appl. No. 11/450,994.

Interview Summary mailed Nov. 9, 2010 for U.S. Appl. No. 11/450,994.

U.S. Appl. No. 12/784,787, filed May 21, 2010.

"2004 US Equity Research Industry Outlook—Table of Contents", Integrity Research Associates (3 pages).

"An Interview with Mark Coker, Founder of Best Calls", 2000, 4 pages.

"Analyst Meeting", Dell Inc., Austin, Texas, Apr. 8, 2004, 55 pages.

"Buy-Side Still Values Sell-Side Research, Study Says", FinanceTech, Mar. 26, 2008 (2 pages).

"Code of Practice for Enhanced Commissions Processing," Thomson Financial esg, OASYS, Sep. 28, 2000, pp. 1-69.

"Eliot Spitzer on His Fund Blitzkrieg", BusinessWeek (Online), New York, Sep. 18, 2003, p. 1 (3 pages).

"Equity Research Outlays Projected to Nearly Double in Next Five Years", PR Newswire, New York, Jun. 21, 2004, p. 1 (2 pages).

"Facing the Charges—Research: The Way Fund Managers Bill Their Clients Needs Reform: [London 1st Edition]", Financial Times, London (UK), Oct. 13, 2003, p. 20 (3 pages).

"International Managers Feel Pinch of Sellside's Cost-Cutting Moves", Fund Action, New York, Jun. 30, 2003, p. 1 (2 pages).

"National Express Group PLC Analyst and Investor Seminar": May 7, 2004, p. 1.

"Prudential Financial to Host Analyst and Investor Conference in Tokyo", Sep. 23, 2004, Business Wire, Jan. 23, 2004.

"Sell-Side Analysts Heading to the Buy Side", Real Estate Finance and Investment, New York, Nov. 3, 2003, p. 1 (2 pages).

"The Commission System", Treatise, Broker-Dealer-Law-and-Regulation, Section 10.02 The Commission System, 2008 (10 pages).

"The Future of Equity Research: Where Will the Investment Community Look?", PR Newswire, New York, Feb. 4, 2004, pg. (2 pages).

"The October Revolution on Wall Street: Strategies for adapting to the changing research landscape," Coffin Communications Group, Jun. 2003.

Anonymous, "Sell-Side Story", Prweek (U.S. ed.), New York, Jul. 7, 2003, p. 17 (5 pages), vol. 6, Issue 26.

Boni, et al., "Wall Street's Credibility Problem: Misaligned Incentives and Dubious Fixes?," 5th Annual Brookings-Wharton Conference on the Future of Securities Markets, Brookings-Wharton Papers on Financial Services, 2002.

Boni, L. et al., "Solving the Sell-Side Research Problem: Insights from Buy-Side Professionals," working paper, University of New Mexico, Aug. 8, 2002.

Boni, Leslie et al., "Wall Street Research: Will New Rules Change Its Usefulness?", Financial Analysts Journal, May/Jun. 2003 (7 pages), vol. 59, Issue 3, ABI/INFORM Global.

Brennan et al., "Brokerage Commission Schedules," The Journal of Finance, vol. 48, No. 4, Sep. 1993, pp. 1379-1402.

Business Editors/High-Tech Writers, "Independent Research Group Builds Equity Research Team", Business Wire, New York, Mar. 13, 2003, p. 1 (5 pages).

Chapman, P., "Keeping a Score for Traders: A Database That Keeps Track of Customer Business", Traders Magazine, New York, Dec. 1, 2003, p. 1 (3 pages).

Chapman, P., "Rating Sellside Services: Software Made for Buyside Spendthrifts", Traders Magazine, New York, May 1, 2004, p. 1 (3 pages).

Chen, Z., "Buy-Side and Sell-Side: The Industrial Organization of Information Production in the Securities Industry", University of Pennsylvania—The Wharton School, Mar. 2004, pp. 1-64.

Friedlander, J., "Independents to Gobble Research Pie in Future Study says Industry to Nearly Triple, Taking Money from Big Street Firms", The Investment Dealers' Digest: IDD, New York, Jul. 5, 2004, p. 1 (2 pages).

Granof et al., "Using Activity-Based Costing to Manage More Effectively," PriceWaterhouseCoopers Report, Jan. 2000.

Gullapalli, D., "Moving the Market—Tracking the Numbers/Street Sleuth: On Governance, Wall Street May Carry Big Stick; After a Report by Goldman, Companies Make Changes; Right Role for 'Sell Side'?", Wall Street Journal, (Eastern Edition), New York, Aug. 31, 2004, p. C.3 (2 pages).
Krantz, M., "Research for Individuals Can Cost a Bundle", USA Today, Dec. 2, 2002 (3 pages), accessed May 14, 2008, 3:51 PM from http://www.usatoday.com/money/industries/brokerage/2002-11-27-resea . . . .
Leone, M., "The Flight of the Sell-Side Analyst", CFO.com, Boston, Jul. 8, 2004, p. 1 (2 pages).
Levitt, A., "Speech by SEC Chairman: Remarks before the 2000 Annual Meeting Securities Industry Association," US Securities and Exchange Commission, Boca Raton, Florida, Nov. 9, 2000.
McCafferty, J., "Reform of Sell-Side Research is Creating a Variety of New Headaches for Corporations," CFO Magazine, May 1, 2003.
Mehta, N., "Sellside Research Must Try Harder: Rocked by Scandals, Institutional Sellside Research Will Never be the Same", Traders Magazine, New York, Dec. 1, 2003, p. 1 (6 pages).
Milhench, C., "Global Brokers Survey: Rethinking the Research Model", Global Investor, London, Sep. 2004, p. 1 (29 pages).
Munk, C. Winokur, "Analysts' Roles Evolve with Incentives", Wall Street Journal (Eastern Edition), New York, May 21, 2003, p. 1 (4 pages).
Myner, "Institutional Investment in the United Kingdom: A Review," Mar. 6, 2001 ("The Myner's Report").
Nocera, J., "Wall Street on the Run", Fortune, New York, Jun. 14, 2004, vol. 149, Issue 12, p. 107 (6 pages).
Roztocki et al., "An Integrated Activity-Based Costing and Economic Value Added System As An Engineering Management Tool—Manufacturers," 1998 ASEM National Conference Proceedings, Virginia Beach, Oct. 1-3, 1998, pp. 77-84.
Schmerken, "Bracing for Disclosure of Soft Dollars," Wall Street & Technology, Aug. 27, 2004.
SEC-REL, SEC-Docket 79 SEC-Docket 2540-113, "United States of America Before the Securities and Exchange Commission", Release No. ID-225, Administrative Proceeding File No. 3-10607, Mar. 19, 2003 (13 pages).
Sisk, M., "The Best of the Buy Side—II Magazine Platinum", Institutional Investor, (International Edition), New York, Jun. 2003, p. 1 (6 pages).
Stock, H., "Most Buy Siders Use Sell-Side Reports for Tips, Despite Conflicts", Investor Relations Business, New York, May 12, 2003, p. 1 (4 pages).
Thomson, "Best Practices Report: The Broker Voting Process, Commentary and Analysis", Thomson Extel Surveys, Feb. 2008 (5 pages).
U.S. Dept. of Energy, "Activity Based Costing," Cost Estimating Guide, Chap. 24, Mar. 1997.
Tumolo, M., Business-to-Business Exchanges, Information Systems Management; Spring 2001, vol. 18, Issue 2, 25 pages.
Anonymous, "LA Based Credit Union Installs Harland's Touche Solution", May 2002, Bank Systems and Technology, V39N5, 2 pages.
Anonymous, "Business Objects Launches Ithena, Inc.: New Subsidiary Defines First E-Customer Intelligence Analytic Application" Feb. 9, 2000, Business Wire, 0006.
Non-Final Office Action mailed Mar. 19, 2008 for U.S. Appl. No. 10/856,442.
Non-Final Office Action mailed Dec. 11, 2008 for U.S. Appl. No. 10/856,442.
Interview Summary mailed Mar. 17, 2009 for U.S. Appl. No. 10/856,442.
Final Office Action mailed Aug. 4, 2009 for U.S. Appl. No. 10/856,442.
Non-Final Office Action mailed May 21, 2008 for U.S. Appl. No. 10/857,526.
Non-Final Office Action mailed Mar. 16, 2009 for U.S. Appl. No. 10/857,526.
Interview Summary mailed May 15, 2009 for U.S. Appl. No. 10/857,526.
Non-Final Office Action mailed May 6, 2008 for U.S. Appl. No. 10/857,400.
Interview Summary mailed Jul. 14, 2008 for U.S. Appl. No. 10/857,400.
Non-Final Office Action mailed Dec. 9, 2008 for U.S. Appl. No. 10/857,400.
Interview Summary mailed Apr. 2, 2009 for U.S. Appl. No. 10/857,400.
Final Office Action mailed Aug. 3, 2009 for U.S. Appl. No. 10/857,400.
Non-Final Office Action mailed Jan. 30, 2008 for U.S. Appl. No. 10/939,087.
Interview Summary mailed Apr. 11, 2008 for U.S. Appl. No. 10/939,087.
Interview Summary mailed May 16, 2008 for U.S. Appl. No. 10/939,087.
Non-Final Office Action mailed Sep. 17, 2008 for U.S. Appl. No. 10/939,087.
Notice of Allowance mailed Jul. 9, 2009 for U.S. Appl. No. 10/939,087.
Interview Summary mailed Aug. 27, 2009 for U.S. Appl. No. 10/856,442.
Notice of Allowance mailed Oct. 6, 2009 for U.S. Appl. No. 10/857,526.
Notice of Allowance mailed Dec. 14, 2009 for U.S. Appl. No. 10/856,442.
Notice of Allowance mailed Nov. 17, 2009 for U.S. Appl. No. 10/857,400.
U.S. Appl. No. 10/856,442, filed May 28, 2004.
U.S. Appl. No. 10/857,526, filed May 28, 2004.
U.S. Appl. No. 10/857,400, filed May 28, 2004.
U.S. Appl. No. 10/939,087, filed Sep. 10, 2004.
U.S. Appl. No. 11/450,994, filed Jun. 12, 2006.
Notice of Allowance mailed Dec. 8, 2010 for U.S. Appl. No. 12/784,787.
"ITPC Model Commission Working Group", Securities Industry Association, Feb. 2002, 16 pages.
Clark, "Best Execution and Soft Dollars", A Compliance Focus on Trading, Perspectives/Trading/2000, pp. 64-69.
Ambachtsheer, "The soft dollar question: What is the answer?", Financial Analysts Journal, Jan./Feb. 1993, vol. 49, Issue 1, 4 pages.
Interview Summary mailed Nov. 17, 2009 for U.S. Appl. No. 10/857,400.
Notice of Allowance mailed Jan. 26, 2011 for U.S. Appl. No. 11/450,994.

* cited by examiner

| Step 1 - Set Scoring | Step 2 - Set Service Inventory | Step 3 - Optimize | Relationship Optimization |

Step 1: Select Scoring Scenario

Current ▼

Step 2: Set Inventory Scenario

| Category | Category Weight |
|---|---|
| Value Platform | 50.0% |
| Productivity | 25.0% |
| Satisfaction | 10.0% |
| Potential | 15.0% |
| Broker Vote | 0.0% |
| Group Total | 100.0% |

| Item | Attribute Weight | Category |
|---|---|---|
| Revenue | 50.0% | Value Platform |
| Market Share 2003 | 25.0% | Value Platform |
| Rank 2003 | 25.0% | Value Platform |
| Contribution Market Share | 100.0% | Profitability |
| VGS Hit Ratio | 100.0% | Satisfaction |
| Max Share/Sweet Spot | 33.3% | Potential |
| Projected Revenues | 33.3% | Potential |
| Projected Contribution | 33.3% | Potential |
| Value of Research | 100.0% | Broker Value |
| Value Total | 100.0% | Satisfaction Total | 100.0% |
| Potential Total | 100.0% | Broker Vote Total | 100.0% |
| Profitability Total | 100.0% | | |

FIG. 5

MATCHING RESOURCES OF A SECURITIES RESEARCH DEPARTMENT TO ACCOUNTS OF THE DEPARTMENT

This application is a continuation of co-pending U.S. patent application Ser. No. 10/857,400 filed on May 28, 2004, now allowed, which is incorporated herein by reference in its entirety.

BACKGROUND

1. Field of the Invention

The present invention generally concerns techniques for matching resources of a sell-side securities research department to clients (or accounts) of the securities research department.

2. Background of the Invention

In the securities research industry, so called "sell-side firms" provide, among other things, research regarding securities (such as stocks or bonds) to so-called "buy-side firms," i.e., institutional investors such as mutual funds, hedge funds, pension funds, etc. Historically, analysts of the sell-side firm largely determined the amount of service a particular client buy-side firm received from the sell-side firm. The analysts were typically given some guidance as to which clients were more important relative to others (such as in terms of profitability to the sell-side firm) in the assumption that more service resources would be allocated to those clients, but often the service levels were driven by other considerations, such as the ranking of the analyst. This often resulted in an inefficient allocation of resources by the research department. Accordingly, there exists a need for techniques to optimize the allocations of resources of a securities research department.

SUMMARY

In one general aspect, the present invention is directed to a system for allocating limited resources of a securities research department to accounts of the department. According to various embodiments, the system includes an account scoring module and a resource matching module. The account scoring module is for generating a score for each account, and the resource matching module is for matching the resources of the department to the accounts based on the scores for each account. The system may also include a forecasting module for estimating the financial (or economic) impact to the research department of making various resource allocations.

In various implementations, the resources of the securities research department to be matched to the accounts are analyst-contact relationships. The score is a way to represent the value of the account relative to other accounts based on attributes and the attributes' relative importance in being relevant in determining the account's value to the securities research department. The score of an account may be based on a hierarchical tree of categories and attributes. The account's score may be based on a weighted percentage average of the account's score in the categories. The account's score for each category may be based on a weighted percentage average of the account's ranking for each attribute related to the particular category. The attribute rankings may be, for example, percentile rankings.

The resource matching module may match the resources of the department to the accounts based on the scores for each account. The inventory (or available capacity) for each resource in input into the system. The resource matching module may match the resources of the department to the accounts by (i) distributing a number of points to each account based on the score of the account as determined by the account scoring module; (ii) spreading the points of each account across the resources of the firm that are of interest to the particular accounts; and (iii) matching the resources to the accounts based on the number of points allocated to the resource for each account. When a particular account has points allocated to a resource for which there is no remaining inventory, the points of the account allocated to that resource may be distributed to other resources of interest to the account for which there is remaining inventory.

In another general aspect, the present invention is direct to a method for allocating limited resources of a securities research department to accounts of the department. According to various embodiments, the method may include generating a score for each account, and matching the resources of the department (such as analyst-contact relationships, one-to-one meetings, conference attendance, corporate events, etc.) to the accounts based on the scores for each account.

FIGURES

Various embodiments of the present invention are described herein by way of example with reference to the following figures, wherein:

FIGS. 5 and 6 illustrate screen shots generated by the user interface according to various embodiments of the present invention.

DESCRIPTION

Figure 1:
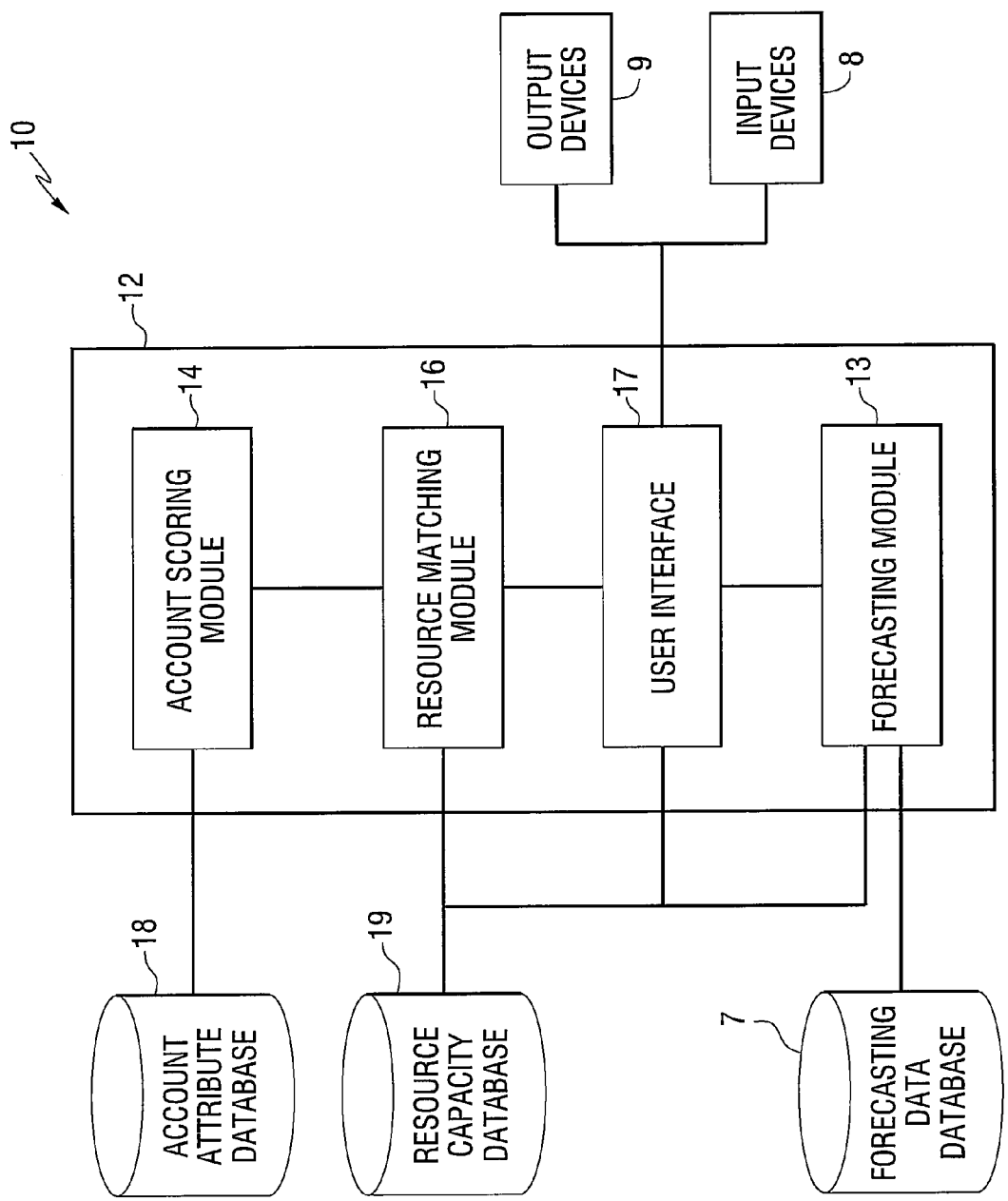
FIG. 1 is a diagram of a system according to various embodiments of the present invention.

FIG. 1 is a diagram of a system 10 according to various embodiments of the present invention. The system 10 may be used for matching scarce or limited resources of a supplier of securities research (e.g., equities and/or debt securities research) to consumers of the research. For purposes of the description to follow, the supplier of the securities research is sometimes referred to as a "sell-side firm" or as the "securities research department." The sell-side firm may be, for example, a brokerage or investment house, or an independent research firm. The consumer of the securities research may be an institutional investor, such as a pension fund, a mutual fund, or a hedge fund, or any other type of buy-side firm. The consumer of securities research is sometimes referred to herein as a "client" or "account" of the sell-side firm supplying the securities research, or as a "buy-side firm."

According to various embodiments, the system 10 includes a computing device 12 comprising a number of modules. For example, as illustrated in FIG. 1, the computing device 12 may include an account scoring module 14, a resource matching module 16, a forecasting module 13, and a user interface 17. The modules 13, 14, 16, 17 may be implemented as software code to be executed by a processor (not shown) of the computing device 12 using any suitable computer language, such as, for example, Java, C++, or Perl, etc., using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM. The computing device 12 may be implemented as one or a number of networked computing devices, such as personal computers, laptops, workstations, servers, etc.

The account scoring module 14 may generate a score (the "service score") for accounts of the securities research department based on one or more attributes. The service scores may be used, for example, to rank the value of an account to the sell-side firm relative to other accounts that do business with the sell-side firm. The scores, according to various embodiments, may consist of the weighted average percentiles that each account scores in each of the attributes that are included in computing the score and the relative weights of each attribute and category (e.g., cluster of attributes). Attributes can be, for example, quantitative or qualitative factors, but each factor is preferably translated to a quantitative form. For example, a qualitative factor may be translated using a scale of 1 to 100 to assess how much the account exhibits the particular factor with 1 being very little and 100 being very much. The account attribute data may be stored in an account attribute database 18.

The resource matching module 16 may, according to various embodiments, distribute an arbitrary number (such as 100,000, for example) of points ("preference points") to the accounts based on the service scores of the respective accounts, as determined by the account scoring module 14. Accounts may receive preference points in direct proportion to their share of all service score points given to accounts by the account scoring module 14, as described in more detail below. A percentage of the total preference points for each account may then be allocated to specific resources of the securities research department as a bid or other quantitative indication of interest by the account for that resource. The resource matching module 16 may then match the resources of the securities research department to the accounts based on the bids, as described further below. The inventory of resources may be stored in a resource capacity database 19.

The user interface 17, as described in more detail below, may allow a user of the system 10, via input devices 8 (such as a keyboard or mouse) and output devices 9 (such as a display monitor) to, for example, set the weightings of the attributes and categories of the scoring scenario, define the resource inventory (e.g., analyst-contact relationships), project revenues from accounts based on the results of the resource matching module 16, etc.

The forecasting module 13 may allow the user of the system to estimate the economic impact to the research department based on various resource allocation decisions, as described in more detail below.

Figure 2:
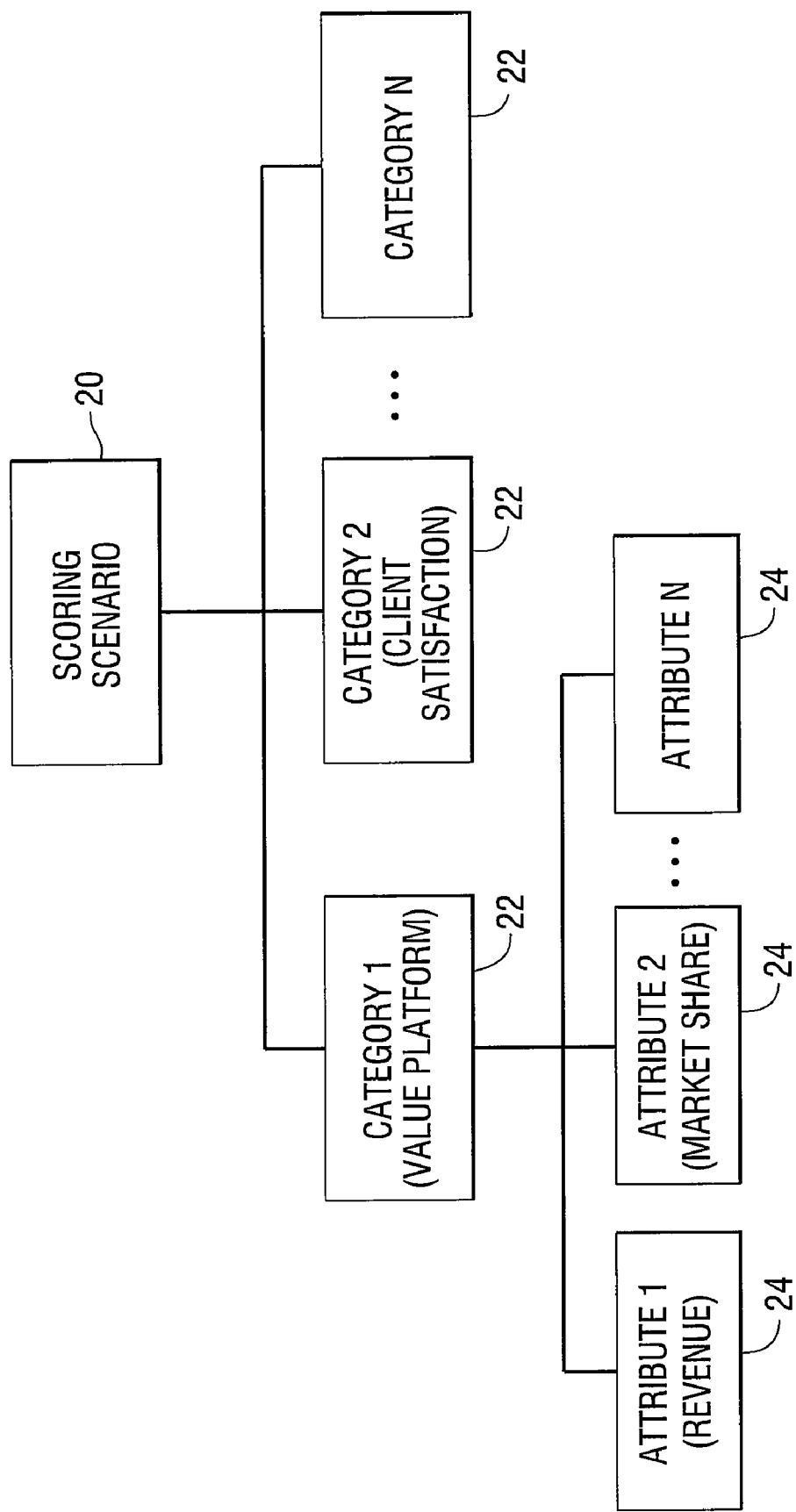
FIG. 2 is a diagram of a scoring scenario according to various embodiments of the present invention.

FIG. 2 is a diagram of a scoring scenario for the account scoring module 14 according to various embodiments of the present invention. As can be seen in FIG. 2, the scoring scenario may be represented as a hierarchical tree. The scoring scenario 20 may include at least one category 22. The number of categories 22 may be determined by the user of the system, e.g., managers or other persons associated with the department. Each category 22 may be weighted as a percentage of how important the category is in determining the value of accounts to the user (i.e., firm). The sum of all category weightings preferably equals 100%. Examples of categories include value platform, client satisfaction, profitability of the account for the sell-side firm, potential of the account, the broker vote, etc. The "broker vote" is a voting survey among large institutional investors in which the institutional investors rank the analysts from various research firms in different market sectors.

Each category 22 may comprise one or more attributes 24. Each attribute 24 may also be weighted as a percentage of how important the attribute is in determining the value of accounts to the user. The sum of all attribute weightings in a category preferably equals 100%. For a value platform category, for example, the attributes may include revenue to the sell-side firm from the account, market share of the sell-side firm for that account, etc. A research department's market share may be determined or estimated by third parties, such as McLagan Partners which tally trading slips.

If information for a particular account in an attribute or category is unavailable, the account scoring module 14 may score the accounts in such a way that the lack of information does not help or hurt the account's overall score, for example. To do so, when calculating an account's overall score, the account scoring module 14 preferably uses the attributes and categories where data is available, and normalizes them by dividing each available attribute or category weight by the sum of all available attribute or category weights. For example, assume a category has three attributes with the following percentage weightings:

| Attribute 1 | 80% |
|---|---|
| Attribute 2 | 10% |
| Attribute 3 | 10% |

If data were only available for Attributes 1 and 2, these attributes would then be weighted as 88.9% for Attribute 1 (computed as 80%/(80%+10%) and 11.1% for Attribute 2 (computed as 10%/(80%+10%). Similarly, if a scoring scenario had three categories weighted 50%-30%-20%, and data were only available for the 50% and 30% categories, the two categories for which data were available may be weighted as 62.5% and 37.5%, respectively.

The account scoring module 14, as mentioned above, may generate a service score for the accounts based on a weighted average percentile of each account's score for each attribute and category. For example, with reference to the scoring scenario of FIG. 2, a particular account may be assigned a percentile score for each attribute/category in the scoring scenario. An account's percentile for an attribute/category may be computed as:

$$\text{percentile} = \text{Integer}\left(\frac{\text{Rank} - 1}{\text{AccountCount}/100} + 1\right)$$

where Rank is the account's rank for the particular attribute/category and AccountCount is the number of the account in the ranking. For example, if an account's rank for a particular attribute/category is $34^{th}$ out of 500 accounts, the percentile for the account would be seven (7). The account scoring module 14 may compute the percentile based on available data or retrieve the percentile for each attribute/category for each account from the account attribute database 18. According to other embodiments, rather than evenly spreading the percentile rankings of the accounts across the scoring range, the rankings of the accounts may reflect the relative value of the account for that attribute/category. For example, if the attribute is revenue to the firm and there are one hundred accounts, and the revenue for one particular is account is twice the revenue of any of the other ninety-nine accounts, that account would receive a score of one-hundred and all of the other accounts would have a score of fifty or less, rather than giving the account that is second in revenue a score of ninety-nine despite the fact that its revenue is half the revenue of the top account.

The resource capacity database 19 may list the resources of the securities research department that need to be allocated to the accounts, as well as the available capacity (e.g., inventory) for each resource. For example, if the resource is analyst-contact relationships, then the database 19 may store the specific analysts of the securities research department that are available for accounts and the total number of relationships that each analyst can maintain at a given time with contacts for the various accounts of the research department (e.g., 50 analyst-contact relationships for an analyst). Each resource element can have its own capacity limit. For example, one analyst may be able to maintain fifty relationships, while another may be able to maintain seventy, etc., depending on the experience and capabilities of the analyst.

Figure 3:
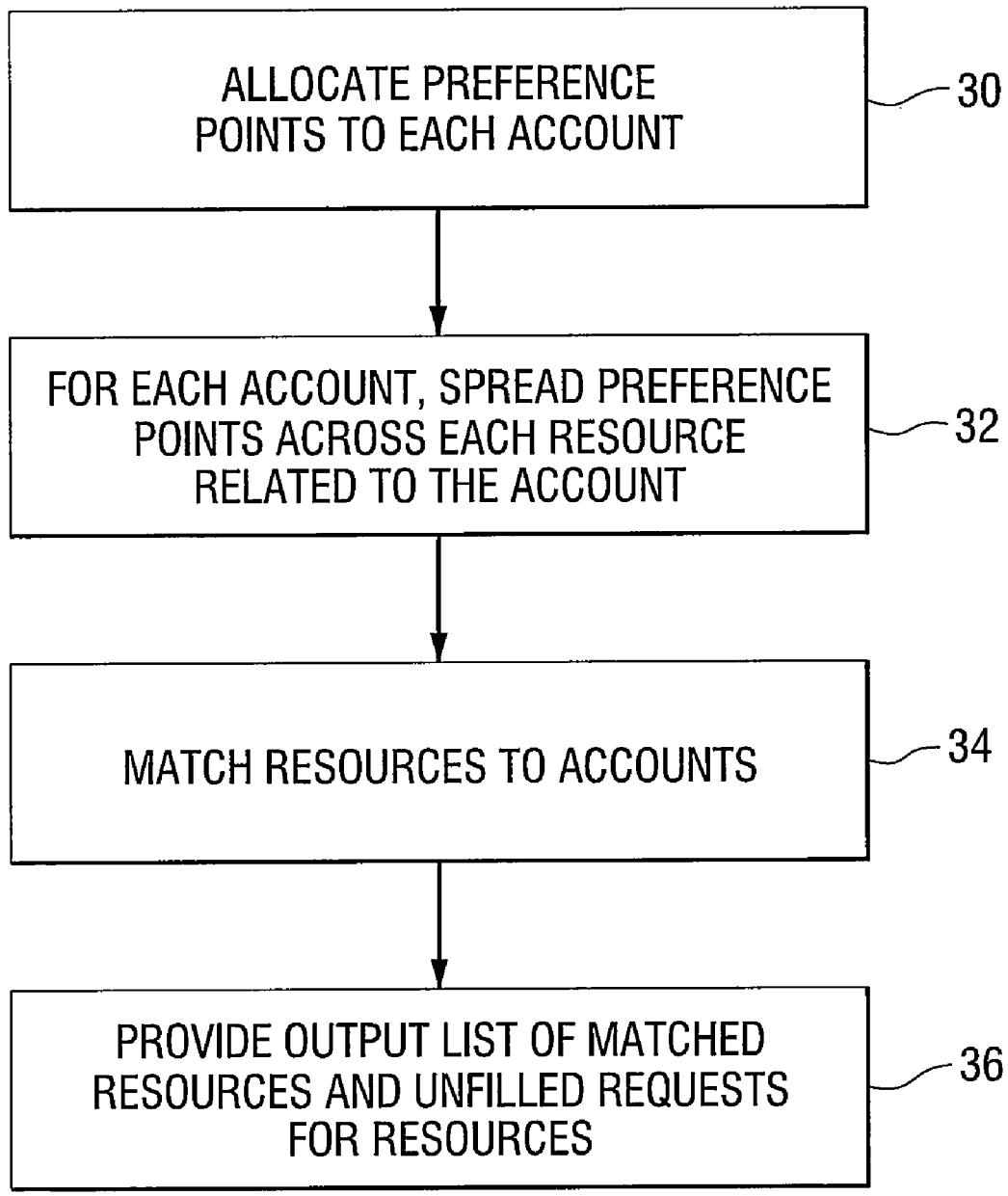
FIGS. 3-4 illustrate process flows of the resource matching module according to various embodiments of the present invention.

FIG. 3 is a diagram of the process flow of the resource matching module 16 according to various embodiments of the present invention. At step 30, the resource matching module 16 may distribute a predetermined, arbitrary number of preference points (e.g., 100,000 preference points) across each account for bidding on resources of the securities research department of interest to the particular account. The resource matching module 16 may distribute the preference points among the various accounts based on the respective service scores of the accounts, as determined by the account scoring module 14. The accounts may receive points in direct proportion to their share of all service score points. For example, the resource matching module 16 may determine the number of preference points to be awarded to a particular account according to the following calculation:

$$\text{Preference Points}_i = \frac{100{,}000 \times \text{ServiceScore}_i}{\sum_{n=1}^{N} \text{ServiceScore}_n}$$

where Preference Points$_i$ is the amount of preference points awarded to account i, Service Score i is the service score for account i, there are N accounts, and 100,000 preference points are used.

Next, at step 32, the preference points for each account are spread across the resources to be matched for the account. For example, if the resources to be matched are analyst-contact relationships, each analyst may have a Point Price indicative of the value of a relationship with the particular analyst for each account. The preference points for each account may be spread across the analysts according to following calculation:

Pref Points per Analyst-Contact Relationship =

$$\frac{\text{Pref Points} * \text{Point Price for Analyst-Contact Relationship}}{\text{Sum of all Point Prices for all Relationships Related to Account}}.$$

A default table of point prices can be used to populate the accounts' initial bids for analyst-contact relationships. Users are preferably able to make changes to the default table values to reflect their knowledge of an account's actual preferences. An analysts point price may depend upon the analyst's popularity and the importance of the industry sector covered by the analyst.

Figure 4:
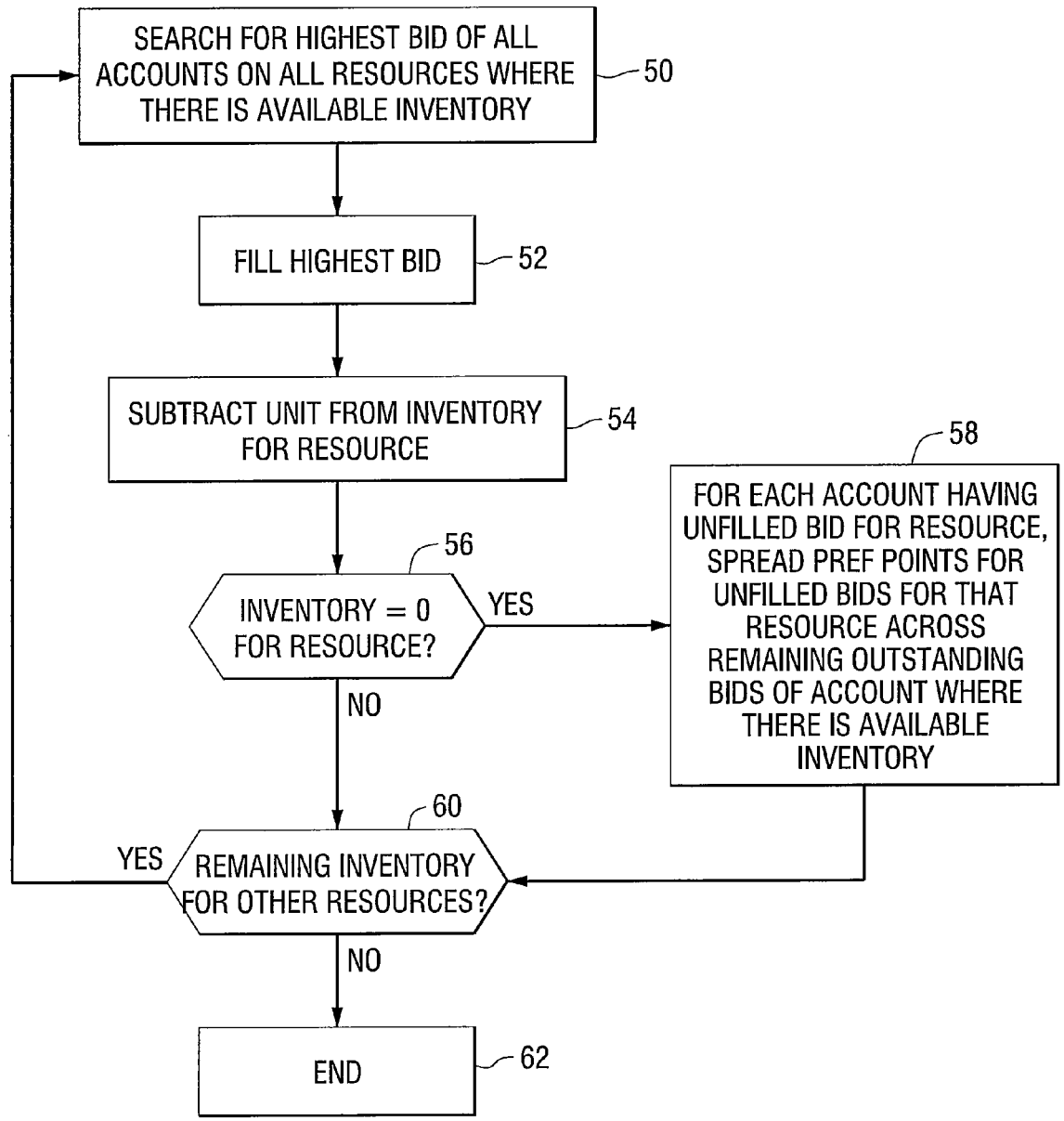

Next, at step 34, the resource matching module 16 may match the resources to the various accounts. The resource matching module 16 may perform the matching process of step 34 according to the process flow of FIG. 4 according to various embodiments of the present invention. Referring to FIG. 4, at step 50, the resource matching module 16 may search for the highest bid for all of the accounts on all of the resources where there is available inventory (e.g., analyst-contact relationships). At step 52, the resource matching module 16 may fill the highest bid and, at step 54, subtract the unit corresponding to the filled bid from the available inventory for that resource. For example, if Account A has a bid of X for an analyst-contact relationship with Analyst Y, and X is the highest bid on all available resources, then Account A's bid for the analyst-contact relationship with Analyst Y would be filled, and the number of available analyst-contact relationships for Analyst Y would be reduced by one.

Next, at step 56, the resource matching module 16 may determine if there is available remaining inventory for the resource. That is, the resource matching module 16 may determine if the decrement at step 54 reduced the available inventory for the particular resource to zero. If there is no more available inventory for the resource, the process may advance to step 58, where the resource matching module 16, for each account having unfilled bids for the unavailable resource, may spread the preference points for the unfilled bids across remaining outstanding bids of the account where there is available inventory. According to various embodiments, the preference points for the unfilled bids for the unavailable resource may be spread across the outstanding bids of the account in proportion to the account's outstanding preference point bids for resources.

Next, at step 60, the resource matching module 16 may determine if there is remaining inventory for any of the resources. If so, the process may return to step 50, where the process of matching bids to available resources may be repeated until there is no remaining inventory for each of the resources. When no inventory remains, or there are no unfulfilled bids (which is unlikely), the process may end at step 62.

Returning to FIG. 3, following the matching of the resources to the accounts at step 34, the process flow of the resource matching module 16 may advance to step 36, where the resource matching module 16 may provide an output list of matched resources to each account (i.e., list of filled orders) as well as a list of unfilled requests for resources.

Returning to FIG. 1, the user interface 17 may, for example, allow the user of the system 10 to establish the criteria for the scoring scenario. The user interface 17 may display a number of screens for the user on a monitor that the user may complete to, for example, define the scoring scenario(s), define the inventory, specify the resources that are important to a particular account, etc. The user may interact with the user interface 17 via input and output devices 8, 9 locally connected to the system 10 or remotely connected to the system via, for example, a data network such as a LAN.

FIG. 5 is a screen shot 70 that the user interface 17 may provide to the user through which the user may define the scoring scenario according to various embodiments. In field 72, for example, the user may name the scoring scenario. In field 74, the user may specify the categories of the scoring scenario (see FIG. 2) and specify the percentage weights for each category. In field 76, the user may specify the attributes for each category and the percentage weights for each attribute. In the illustrated example, the sum of the percentage weights for each category equals 100%, as does the sum of the percentage weights for each attribute for each of the categories.

Figure 6:
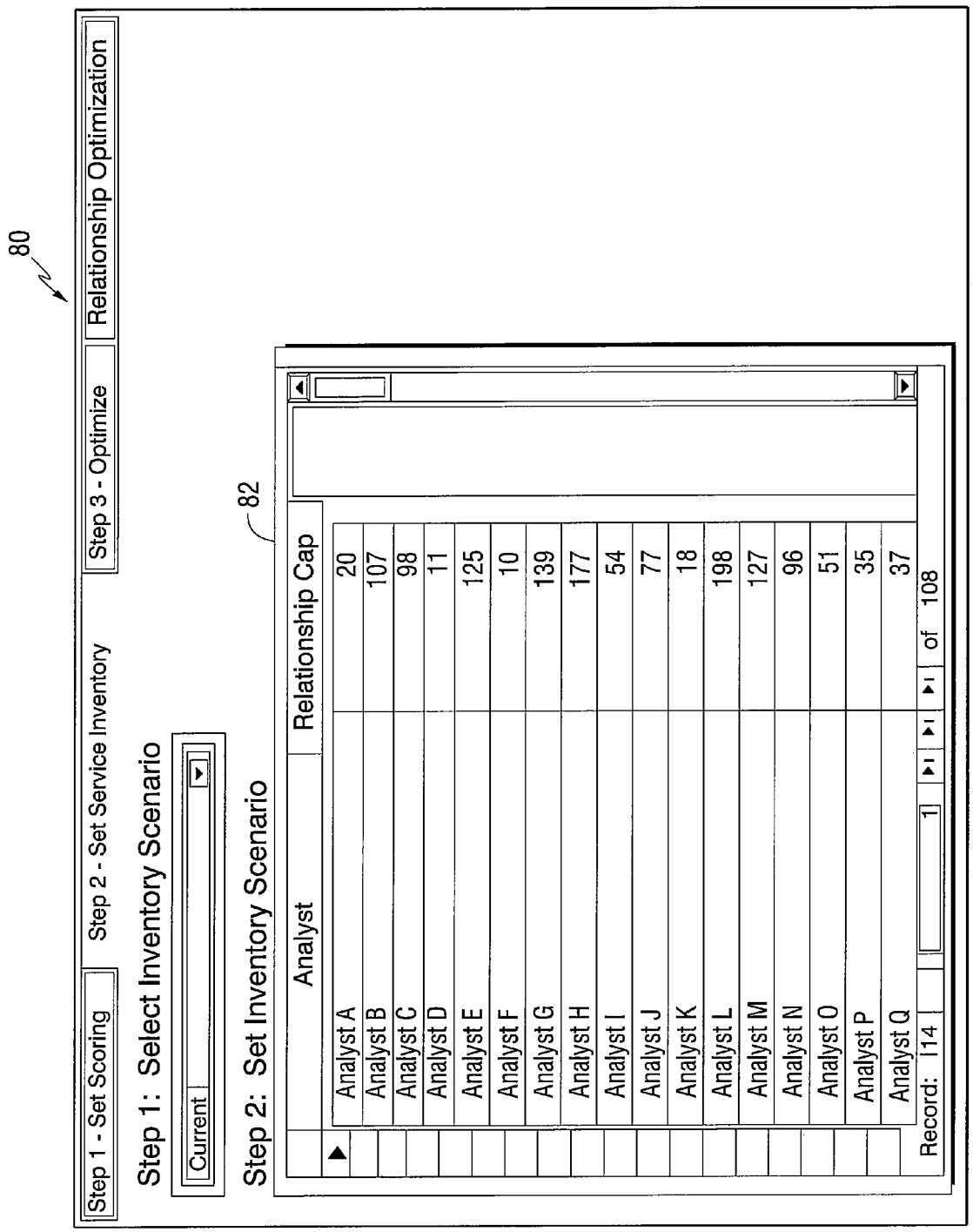

FIG. 6 is a screen shot 80 that the user interface 17 may provide to the user through which the use may define the inventory levels of the resources to be allocated. For an application where the resources are analyst-contact relationships, in field 82 the user may specify the different analysts and the total number of relationships that each analyst can maintain at a given time.

In a similar way, the user interface 17 may also provide the user with an opportunity to review the list of assignments and unfilled bids, and make changes to the list for various reasons, such as correcting perceived inequities in the assignments. Also, the system 10 may allow the user to create and save various scenarios, such as for different scoring scenarios, inventory capacities and account preferences.

The forecasting module 13 may be in communication with a forecasting data database 7 and allow a user of the system to estimate the economic impact of various resource allocation decisions. For example, based on data stored in the database 7 regarding the cost of certain analyst-contact relationships, the user may determine the cost of increasing or decreasing the number of relationships allocated to a particular client. Based on knowledge about how such changes would affect the market share of the sell-side firm of the client's total street spend, the benefit of increasing or decreasing the relationships could be evaluated.

While several embodiments of the invention have been described, it should be apparent, however, that various modifications, alterations and adaptations to those embodiments may occur to persons skilled in the art with the attainment of some or all of the advantages of the present invention. For example, various steps in the processes described herein may be performed in alternative orders. Also, although the various embodiments described above have been described in the context of a securities research department, the system may be used by any entity or firm having limited resources and information about account preferences. It is therefore intended to cover all such modifications, alterations and adaptations without departing from the scope and spirit of the present invention as defined by the appended claims.

What is claimed is:

1. A system for allocating limited resources of a securities research entity to a plurality of accounts associated with the securities research entity, the system comprising a computing device, wherein the computing device comprises:
   at least one processor and an operatively associated computer readable medium, wherein the computer readable medium comprises instructions thereon that, when executed by the at least one processor cause the computing device to:
      receive values for a plurality of attributes from an account attribute data store, wherein each of the plurality of attributes describes at least one of the plurality of accounts;
      for each of the plurality of accounts, generate a service score based at least in part on values selected from the values for the plurality of attributes, wherein each service score indicates a value of the corresponding account to the securities research entity relative to other accounts selected from the plurality of accounts; and
      match the resources of the securities research entity to the plurality of accounts based at least in part on the service score for each account, wherein the match of the resources to the accounts comprises:
         determining a number of preference points assigned to each account of the plurality of accounts based on the service score of the account;
         receiving resource capacity data from the resource capacity database, wherein the resource capacity data indicates a quantity of resources available to be matched;
         receiving allocation data indicating an allocation of the preference points assigned to each account across at least one of the resources of the securities research entity; and
         matching the resources to the plurality of accounts based at least in part on the number of preference points allocated to the resource for each account.

2. The system of claim 1, wherein the computer readable medium further comprises instructions thereon that, when executed by the at least one processor, cause the computing device to estimate the financial impact of resource allocations.

3. The system of claim 1, wherein the plurality of attributes are organized into at least one category, and wherein the computer readable medium further comprises instructions thereon that, when executed by the at least one processor, cause the computing device to generate the service score for each account based on a weighted percentage average of values for a plurality of the one or more attributes related to each category and describing the account.

4. The system of claim 3, wherein the values for the attributes include percentile rankings.

5. The system of claim 1, wherein the computer readable medium further comprises instructions thereon that, when executed by the at least one processor, cause the computing device to implement a user interface for allowing a user to define a scoring scenario by which the service scores of the accounts are determined.

6. The system of claim 5, wherein the user interface is further for allowing the user to define resources and the capacity for each resource.

7. The system of claim 1, wherein the resources of the securities research entity comprise at least one resource selected from the group consisting of:
   at least one analyst-contact relationship;
   attendance at a one-to-one meeting with a securities research analyst;
   attendance at a securities research conference; and
   attendance at a corporate event hosted by the securities research entity.

8. The system of claim 1, wherein each attribute value for an account comprises a ranking of the account in the attribute relative to other accounts of the securities research entity.

9. The system of claim 1, wherein matching the resources to the plurality of accounts based at least in part on the number of preference points allocated to the resource for each account comprises, for each resource:
   identifying an account having the most preference points allocated to the resource;
   matching the resource to an account having the most preference points allocated to the resource; and
   conditioned on all resources of the same type as the resource being matched and for all accounts having remaining preference points allocated to resources of the same type as the resource being matched, reallocating the preference points of the accounts to resources of different types.

10. A computer-implemented method for allocating limited resources of a securities research entity to a plurality of accounts of the securities research entity, comprising:
   receiving by a computing device from an account attribute data store values for a plurality of attributes, wherein each of the plurality of attributes describes at least one of the plurality of accounts, wherein the computing device comprises at least one processor and operatively associated memory;

for each of the plurality of accounts, generating by the computing device a service score based at least in part on values selected from the values for the plurality of attributes, wherein each service score indicates a value of the corresponding account to the securities research entity relative to other accounts selected from the plurality of accounts; and matching the resources of the securities research entity to the plurality of accounts based at least in part on the service score for each account, wherein the matching of the resources to the accounts comprises:

determining by the computing device a number of preference points assigned to each account of the plurality of accounts based on the service score of the account;

receiving resource capacity data by the computing device from the resource capacity database, wherein the resource capacity data indicates a quantity of resources available to be matched;

receiving by the computing device allocation data indicating an allocation of the preference points assigned to each account across at least one of the resources of the securities research entity; and matching the resources to the plurality of accounts by the computing device based at least in part on the number of preference points allocated to the resource for each account.

11. The method of claim 10, further comprising estimating the financial impact of resource allocations.

12. The method of claim 10, wherein the plurality of attributes are organized into at least one category, and further comprising generating the service score for each account based on a weighted percentage average of values for a plurality of the one or more attributes related to each category and describing the account.

13. The method of claim 12, wherein the values for the attributes include percentile rankings.

14. The method of claim 10, further comprising implementing a user interface for allowing a user to define a scoring scenario by which the service scores of the accounts are determined.

15. The method of claim 14, wherein the user interface is further for allowing the user to define resources and the capacity for each resource.

16. The method of claim 10, wherein the resources of the securities research entity comprise at least one resource selected from the group consisting of:
   at least one analyst-contact relationship;
   attendance at a one-to-one meeting with a securities research analyst;
   attendance at a securities research conference; and
   attendance at a corporate event hosted by the securities research entity.

17. The method of claim 10, wherein matching each of the resources to one of the plurality of accounts based on the number of preference points allocated to the resource for each account comprises, for each resource:
   identifying an account having the most preference points allocated to the resource;
   matching the resource to an account having the most preference points allocated to the resource; and
   conditioned on all resources of the same type as the resource being matched and for all accounts having remaining preference points allocated to resources of the same type as the resource being matched, reallocating the preference points of the accounts to resources of different types.

18. A computer-implemented method for allocating limited resources of a securities research entity to a plurality of accounts of the securities research entity, comprising:

receiving by a computing device from an account attribute data store values for a plurality of attributes, wherein each of the plurality of attributes describes at least one of the plurality of accounts, wherein the computing device comprises at least one processor and operatively associated memory;

for each of the plurality of accounts, generating by the computing device a service score based at least in part on values selected from the values for the plurality of attributes, wherein each service score indicates a value of the corresponding account to the securities research entity relative to other accounts selected from the plurality of accounts; and matching the resources of the securities research entity to the plurality of accounts based at least in part on the service score for each account, wherein the matching of the resources to the accounts comprises:

determining by the computing device a number of preference points assigned to each account of the plurality of accounts based on the service score of the account;

receiving resource capacity data by the computing device from the resource capacity database, wherein the resource capacity data indicates a quantity of resources available to be matched;

for each account, determining a default allocation of the preference points assigned to the account across at least one of the resources of the securities research entity;

matching the resources to the plurality of accounts by the computing device based at least in part on a number of preference points allocated to the resource for each account.

19. The method of claim 18, wherein the number of preference points allocated to the resource for each account is equal to the default allocation of the preference points for the account.

20. The method of claim 18, further comprising receiving a second allocation of the preference points assigned to an account selected from the plurality of accounts across at least one of the resources of the securities research entity, and wherein the number of preference points allocated to the resource for the account is equal to the second allocation.

* * * * *